US005207286A

United States Patent [19]

McKelvey

[11] Patent Number: 5,207,286

[45] Date of Patent: May 4, 1993

[54] STEERABLE WHEELCHAIR ATTACHMENT WITH POWERED COUPLING MEANS

[76] Inventor: George P. McKelvey, 405 Monmouth Rd., Freehold, N.J. 07728

[21] Appl. No.: 872,929

[22] Filed: Apr. 23, 1992

[51] Int. Cl.[5] ........ B60K 1/00

[52] U.S. Cl. ........ 180/13; 180/907; 280/304.1

[58] Field of Search ........ 280/304.1; 180/11, 12, 180/13, 65.1, 210, 907

[56] References Cited

U.S. PATENT DOCUMENTS 4,471,972 9/1984 Young ........ 280/304.1
4,518,057 5/1985 McCallum ........ 180/907

FOREIGN PATENT DOCUMENTS 2505652 11/1982 France ........ 180/907

*Primary Examiner*—Margaret A. Focarino
*Assistant Examiner*—Victor E. Johnson
*Attorney, Agent, or Firm*—Patrick J. Pinto

[57] ABSTRACT

A steerable and self-powered attachment for wheelchairs. This attachment is free-standing and includes a powered coupling means which is adapted for simultaneous attachment while the front of a wheelchair, carried thereon, is lifted to provide three wheel contact with the surface. The attachment includes a auxiliary frame, a drive means, a steering means, and the powered coupling means. The attachment is adapted to be coupled to the wheelchair by the occupant by actuation of a switch.

19 Claims, 3 Drawing Sheets

STEERABLE WHEELCHAIR ATTACHMENT WITH POWERED COUPLING MEANS

BACKGROUND OF THE INVENTION

1. Field of the Invention

With regard to the classification of art, this invention is believed to be found under the general class of "Land vehicles" and more particularly to the class pertaining to attachments to wheelchairs. This apparatus includes a powered coupling means for attaching to said wheelchair.

2. Description of the Prior Art

Attachable powered units for wheelchairs are known in the art. Some examples of the known art are U.S. Pat. No. 3,912,032, issued to Benz et al on Oct. 14, 1975; U.S. Pat. No. 3,921,744, issued to Benoit et al on Nov. 25, 1975; U.S. Pat. No. 4,316,616, issued to Boivin on Feb. 23, 1982; U.S. Pat. No. 4,483,548, issued to Zirrilo on Nov. 20, 1984; and U.S. Pat. No. 4,503,925, issued to Palmer on Mar. 12, 1985. All of the cited prior art disclose removable attachments for powering and/or steering a wheelchair. Some are manually driven by means of a crank and sprocket arrangement while others are motorized. All of the known prior art require manual attachment of the units to the wheelchair. It is especially difficult for the person in the wheelchair to lean forward while manipulating levers and the like to lift the front of the wheelchair. The combination of leaning forward and the manipulation of levers add to the effort of attaching the apparatus to the wheelchair. Many times the occupant of the wheelchair does not have the capability to perform these motions, therefore the occupant must have to wait until assistance is available.

The present invention overcomes the deficiency of the prior art by combining a steerable and powered attachment which has a powered coupling means. This attachment requires the occupant to move the wheelchair onto guides followed by the activation of a switch.

SUMMARY OF THE INVENTION

It is an object of this invention to provide and it does provide an attachment for wheelchairs which has a powered coupling means.

It is also an object of this invention to provide and it does provide an attachment for wheelchairs which lifts the front of a wheelchair for providing contact of three wheels with the ground.

It is another object of this invention to provide and it does provide an attachment for wheelchairs wherein the occupant can lift the front of the wheelchair to suit the ground conditions.

It is a further object of this invention to provide a method for an attachment for wheelchairs in which the coupling action is powered by a motor.

In addition to the above summary, the following disclosure is detailed to insure adequacy and aid in the understanding of this invention. This disclosure, however, is not intended to cover each new and inventive concept, no matter how it may be disguised either by variations in form or additions by further improvements. For this reason, there has been chosen specific embodiments of a method and apparatus of a steerable and powered wheelchair attachment. This method and apparatus is adapted for use with existing wheelchairs. These specific embodiments, shown in the accompanying drawings, have been chosen for the purpose of illustration and as an aid to the description wherein:

Figure 1:
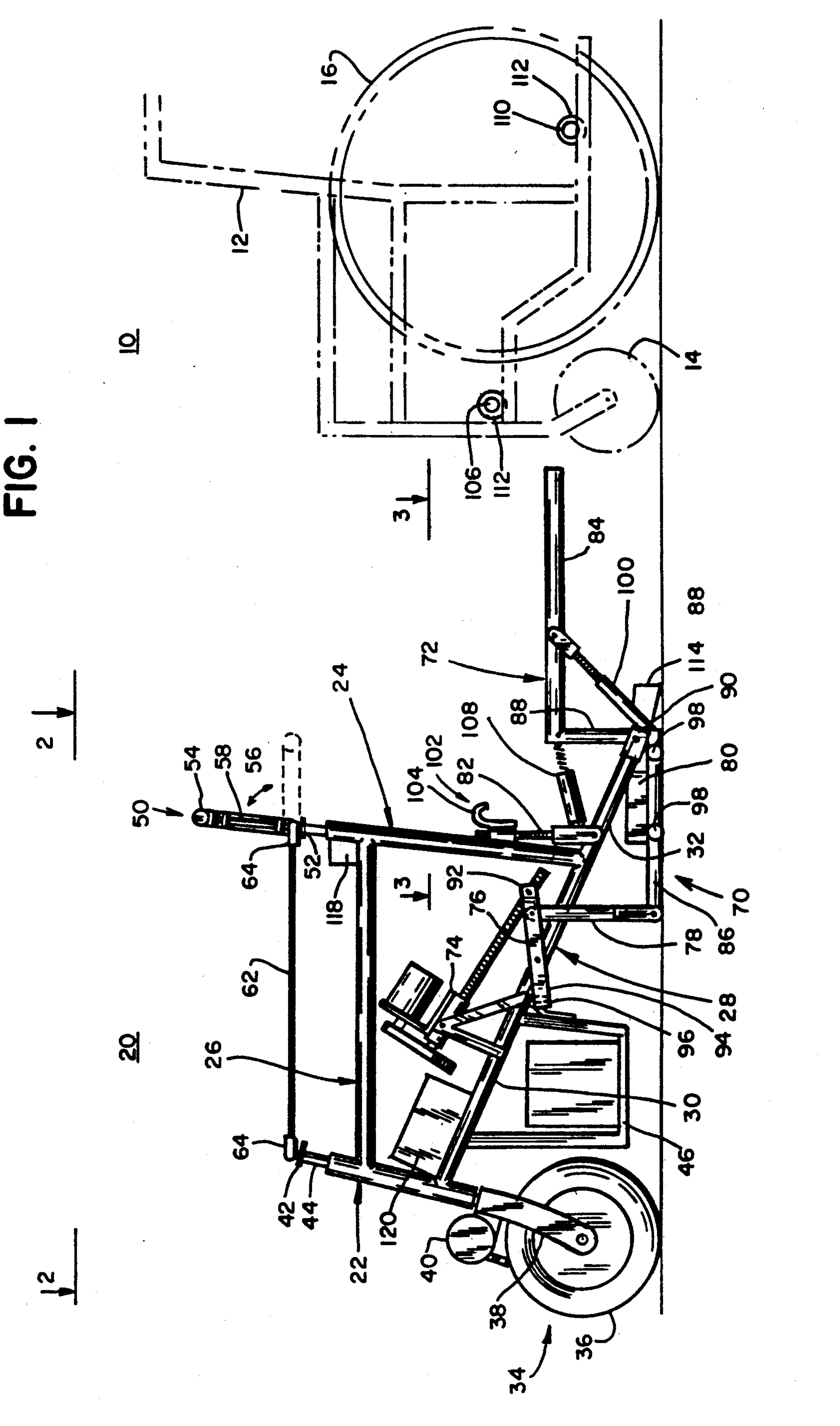
FIG. 1 represents an elevational view of one side of the wheelchair attachment of the present invention, this view partly schematic and showing the apparatus detached from a wheelchair.

In the following description and in the claims, various details are identified by specific names for convenience. These names are intended to be generic in their application while differentiating between the various components. Corresponding reference characters refer to like members throughout the several figures of the drawings.

The drawings accompanying, and forming a part of this specification disclose details of construction for the sole purpose of explanation. It is understood that structural details may be modified without departing from the concept and principles of the invention. This invention may be incorporated in other structural forms than shown.

Referring to FIG. 1, a wheel chair, shown in dashed outline, is generally identified as 10. Also shown is a steerable wheelchair attachment, generally identified as 20. The wheel chair attachment 20 is shown in a detached condition from the wheelchair 10. Typically the wheelchair 10 has a frame 12, front caster-style wheels 14, and large rear wheels 16.

Still referring to FIG. 1, the attachment 20 includes an auxiliary frame which includes a tubular wheel support 22, a steering handle support 24, an upper tie member 26, and a lower tie member 28. The wheel support 22 and steering handle support 24 are held in a selected spaced relationship by the upper tie member 26 and lower tie member 28. Each of the members of the auxiliary frame are preferably attached to each other by welding. The lower tie member 28 has an intermediate portion 30 and an extending end 32.

Still referring to FIG. 1, a wheel assembly 34 is pivotally mounted in the wheel support 22. This wheel assembly 34 includes a drive wheel 36 rotatably carried in a fork member 38, a drive means 40 adapted for driving the drive wheel 36, and a first steering arm 42. The first steering arm 42 is removably attached to a shaft portion 44 of the fork member 38 distal said drive wheel 36. The drive means 40 preferably includes an electric motor connected to the drive wheel 36 by a gear train, sprockets and chain, and the like. The drive means 40 may have an internal combustion engine substituted for the electric motor. When an electric motor is used a source of energy such as a battery or batteries may be mount on a battery holder 46. This battery holder 46 has been shown as being suspended below the lower tie member 30. This site has been chosen for providing additional weight to the drive wheel 36. It is anticipated that other suitable positions for the battery or batteries may be chosen.

Figure 2:
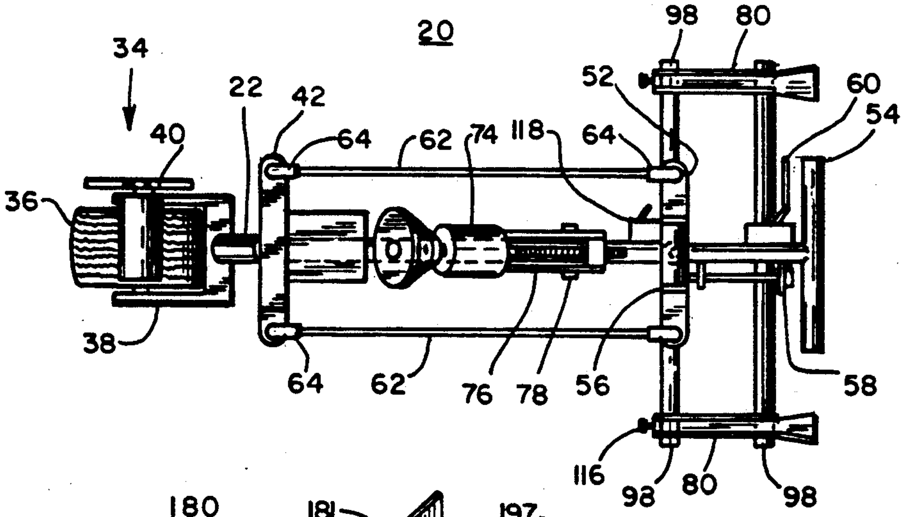
FIG. 2 represents a plan view of the apparatus of FIG. 1, this view being taken along line 2—2 of FIG. 1.

A steering assembly, generally identified as 50, is pivotally received in the steering handle support 24. This steering assembly 50 includes a second steering arm 52, and a steering handle 54. Referring now to FIG. 2, the steering handle 54 is pivotally attached to a pair of mounting ears 56 of the second steering arm 52. The mounting ears 56 allow the steering handle 54 to be adjustably positioned. This adjustable positioning of the steering handle 54 is more clearly seen in FIG. 1 and the direction of adjustable movement is indicated by the arrow. The steering handle 54 includes a releaseable detent means 58. This detent 58 means allows the steering handle 54 to be selectively positioned between the full extent of pivotal movement. Referring again to FIG. 2 a drive control means 60 is also provided on the steering handle 54 for providing control of the drive means 40.

Steering control is transmitted from the second steering arm 52 to the first steering arm 42 by way of at least one tie rod member 62. Each tie rod member 62 is fitted with a swivel connector 64 at each end. This swivel connector 64 preferably is a commercially available rod end. The tie rod member 62 has a left-hand thread at one end and a right hand thread at the other. This opposed threading arrangment allows for the lengthening or shortening of the tie rod member 62 to provide a desired alignment. Although one tie rod member 62 will provide the necessary steering control, the use of two tie rod members 62 is preferred.

Figure 3:
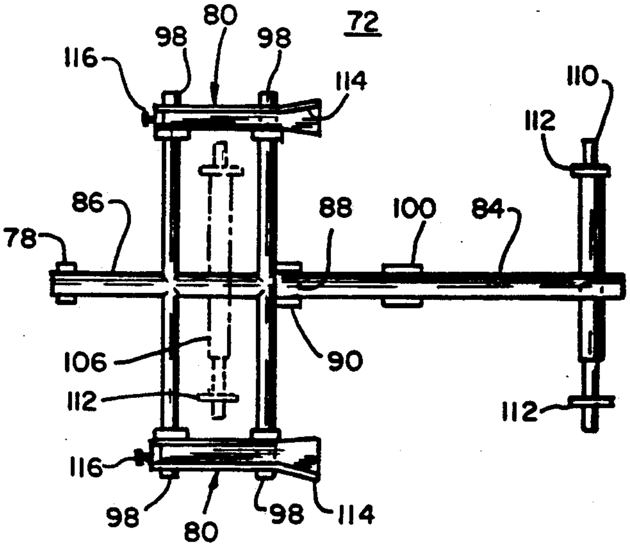
FIG. 3 represents a fragmentary plan view of the apparatus of the present invention, this view partly schematic and being taken along line 3—3 of FIG. 1.

Referring now to FIG. 1 and 3, a powered coupling assembly, generally identified as 70 is carried on the lower tie member 28. This coupling assembly 70 includes a first lever member 72, a linear actuator 74, a second lever 76, a link member 78, a pair of wheel ramps 80, and a third lever member 82.

The first lever 72 is substantially Z-shaped when viewed in a direction reverse to FIG. 1. This first lever 72 has an upper extending portion 84 and a lower extending portion 86 separated by a tie bar 88. The first lever 72 is pivotally mounted to a clevis 90 on the extending end 32 of the lower tie member 28.

A linear actuator 74 is pivotally mounted to the intermediate portion 30 of the lower tie member 28. A pair of second levers 76 are pivotally connected to the lower tie member 28. One end 92 of each of the second lever members 76 is attached to the linear actuator 74 with its other end 94 adapted to engage a limit detection means 96. These second levers 76 are selectively oscillated by the linear actuator 74. A link 78 pivotally connects the second levers 76 to a free end of the lower extending portion 86.

Referring now to FIG. 3, wheel ramps 80 are adjustably mounted to a pair of arms 98 which are transversely mounted to the lower extending portion 86. The spacing between the wheel ramps 80 is adjusted to match the spacing of the front wheels 14 of the wheelchair 10. After the proper adjustment is made, the ramps 80 are clamped to the arms 98 by a suitable means.

A third lever 82 is pivotally attached at one end to the lower tie member 28. A free or second end 102 of the third lever 82 has a hook 104 adjustably mounted thereon. The distance of the hook 104 from the third levers pivot may be adjusted to suit the location of a first cross member 106 mounted to the frame 12 of the wheelchair 10. The third lever 82 is biased by a tension means 108 for moving the third lever 82 into an engaged position. A second cross bar 110 is mounted to the frame 12 near the wheels 16. This second cross bar is engaged by the free end of the upper extending portion 84 of the first lever 72. An adjustable reinforcement means 100 is provided to resist the bending forces exerted on the upper extending portion 84.

When it is desirable to provide an adjustable positioning of the upper extending portion 84 relative to the second crossbar 110, a hinged connection may be provided at the attachment point of upper extending portion 84 to the tie bar 88. A lengthening or shortening of the adjustable reinforcement means 100 will raise or lower the free end of the upper extending portion 84 to clear the second crossbar 110.

USE AND OPERATION

The wheelchair attachment 20 and wheelchair 10 requires an initial preparation and adjustment. It is necessary to locate the first crossbar 106 and second crossbar 110 on the frame 12 of the wheelchair 10. These crossbars 106 and 110 are removably attached by a suitable fastener such as a J-bolt, U-clamp, and the like. each of the crossbars 106 and 110 have flanges 112 welded thereon for abutting the frame 12. Each of the crossbars 106 and 110 is telescopically adjustable to insure abutment of the flanges 112 with the inside of the frame 12. As previously mentioned the first crossbar 106 is selectively located over the front wheel 14. The second crossbar 110 is selectively located on the frame 12, preferably behind the center of the wheel 16..

The next step is to adjust the wheel ramps 80 to align with the wheels 14 of the wheelchair 10. After the wheel ramps 80 have been adjusted and locked in position the wheel chair 10 may be coupled to the attachment 20. It is only necessary to perform the initial adjustment once for a particular wheelchair 10.

As previously mentioned the preferred attachment 20 is electrically operated, with the electrical power being stored in a battery mounted on a battery holder 46. Of course the battery must have a sufficient charge to operate the attachment 20.

Coupling of the wheelchair 10 to the attachment 20 is accomplished by manually wheeling the wheelchair 10 onto the wheel ramps 80. The wheel ramps 80 are provided with edge guides 114 to guide the wheels 14 onto and into a proper location Stops 116 at the end of the wheel ramps 80 are provided to limit the forward motion of the wheelchair 10. The wheelchair occupant need only actuate a switch 118 to begin the powered coupling of the wheelchair 10 to the attachment 20.

Figure 4:
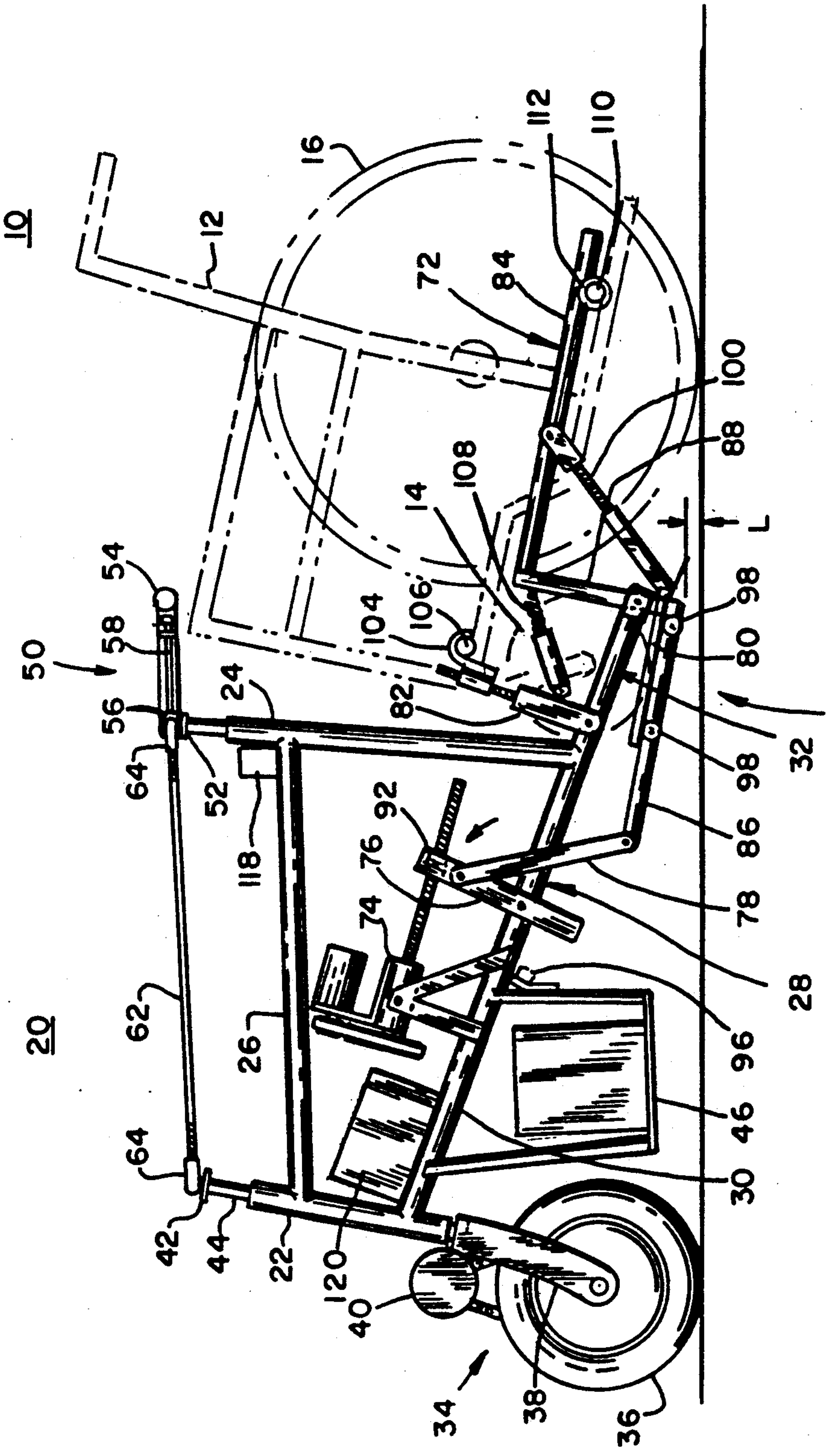
FIG. 4 represents an elevational view of the apparatus of the present invention, this view partly schematic and particularly showing the attachment coupled to a wheelchair.

Referring now to FIG. 4, the actuation of the switch 118 energizes the linear actuator 74 which causes the second lever 76 to swing counter clockwise, as denoted by the arrow. This counter clockwise movement of the second lever 76 rotates the first lever 72 about its pivot in a clock-wise direction. This clockwise rotation of the first lever 72 brings the upper extending portion 84 of the first lever 72 to bear against the second cross bar 110. Simultaneously the third lever 82 engages the first crossbar 106. The clock-wise rotational movement of the first lever 72 raises the front wheels 14 and firmly engages the cross bar 106 by and with the hooked portion 104 of the third lever 82. The front portion of the wheelchair 10 and the coupling end of the attachment 20 are raised simultaneously, The amount of ground clearance L is controlled by the occupant. The ground clearance L is dependent on the surface to be driven on.

The preferred range of lift L is between 2.54 cm (1 in.) and 10.16 cm (4 in.).

After the attachment 20 is fully coupled to the wheelchair 10 the occupant may move the steering handle 54 from its fully up position to a comfortable driving position The fully up position provides clearance for the occupant during the coupling procedure.

The coupled devices 10 and 20 are now ready to be driven by the occupant. The direction and speed of the the powered movement by the drive means 40 is controlled by the drive control 60.

When the occupant wishes to uncouple the devices, the switch 118 is actuated to reverse the linear actuator 74. This reversal of the linear actuator 74 lowers the front of the wheel chair 10 and the attachment 20. The lowering action caused the third lever 82 to be disengaged from the first crossbar 106 to allow the wheel chair occupant to manually move the wheel chair backward and off the wheel ramps 80. It is to be noted that the attachment 20 is supported in its upright position by the transverse arms 98. The movement of the second lever 76 and the positioning of the third lever 82 are detected by suitable limit switches, such as detector 96. Operating circuitry may be contained in an enclosure 120.

The auxiliary frame preferably is of a welded tubular construction. The linear actuator 74 may be a commercially available electrically reversible unit or it may be a threaded shaft driven by an electric motor. The threaded shaft may be fitted with a matching nut which linearly moves along the rotating shaft. The tension means 108 is preferably an extension spring which has a free length selected for assisting in disengaging the third lever 82 from the first cross bar 106. Alternatively the extension spring may have a sleeve member carried thereon. This sleeve member should be of sufficient length and strength to urge the third lever 82 away from the first crossbar 106 as and when the front wheels 14 are brought to a lowered condition.

It is preferred that the drive wheel 36 be of a pneumatic type and be of sufficient diameter and width to propel the coupled .attachment 20 and wheelchair on and over soft earth, grass, and the like. A pneumatic tire having a 12 in outside diameter and a face width of 4 in. has provided the desired characteristics.

It is to be noted that the detent means 58 may only be used to hold the steering handle 54 in an upward position to allow the user to access the attachment 20. The lower or drive position of the steering handle 54 may be limited by an adjustable stop, not shown.

Figure 5:
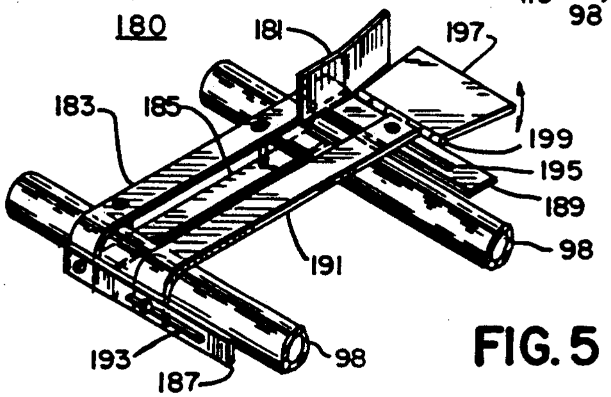
FIG. 5 represents an isometric view of an alternate ramp for supporting the front wheel, this view showing only one of a pair of ramps.

An alternate wheel ramp assembly 180 may be substituted for wheel ramps 80. This alternate wheel ramp assembly 180 is more clearly seen in FIG. 5. This wheel ramp assembly 180 is adapted for adjustably mounting to the transverse arms 98. The wheel ramp assembly 180 includes a wheel guide 181 which is fixed to an outer bar 183. The outer bar 183 is clamped to the transverse arms 98 by clamp bar 185. Extending from each end of the outer bar 183 are brackets 187 and 189. An inner bar member 191 is adjustably fastened to each of the brackets 187 and 189 by way of elongated holes 193 and 195 provided in the brackets 187 and 189. An approach plate 197 is attached to the bracket 189 by way of a hinge 199. This hinged arrangement allows the approach plate 197 to swing in the direction of the arrow. The swinging of the approach plate provides a means for a smooth approach of the wheel chair wheels 14 as well as limiting the scoffing of the approach plate on a floor and the like. The spacing between the outer bar 183 and the inner bar 191 is sufficient for the front wheel 14 to fit therein. A properly positioned front wheel 14 will be cradled between the transverse arms 98 and locked between the outer bar 183 and the inner bar 191. It is to be understood that the mating wheel ramp assembly 180 will be a substantially mirror image of the wheel ramp assembly shown in FIG. 5.

Terms such as "left", "right", "up", down", "bottom", "top", "front", "back", "in", "out", and the like are applicable to the embodiments shown and described in conjunction with the drawings. These terms are merely for the purpose of description and do not necessarily apply to the position in which the wheelchair attachment apparatus of the present invention may be utilized.

While a particular embodiment of an improved Wheelchair attachment has been shown and described, it is to be understood that the invention is not limited thereto and protection is sought to the broadest extent the prior art allows.

What is claimed is:

1. A steerable and powered wheelchair attachment with powered coupling means, said coupling means providing for the simultaneous attachment to and lifting of a front portion of a wheelchair, said attachment comprising:

(a) an auxiliary frame including a tubular wheel support, a steering handle support, an upper tie member, and a lower tie member;

(b) a wheel assembly being pivotally received in said tubular wheel support, said wheel assembly including a drive wheel rotatably carried in a fork member, a powered drive means adapted for selectively driving said drive wheel, and a first steering arm removably fastened to the fork member near an end distal said drive wheel;

(c) a steering assembly being pivotally received in an upper portion of said steering handle support, said steering handle assembly including a second steering arm, and a steering handle, said steering handle being pivotally attached to said second steering arm for adjustably positioning said steering handle as and when needed;

(d) at least one tie rod member connecting said first steering arm with said second steering arm, said tie rod member transmitting steering control from said steering handle to said wheel assembly;

(e) a coupling assembly being pivotally mounted to said lower tie member, said coupling assembly including:

e1) a first lever having a substantially Z-shape, said first lever including an upper extending portion and, a lower extending portion, said first lever sharing a pivotal mounting being pivotally attached to an extending end of said lower tie member;

e2) a linear actuator having reversing capabilities, said linear actuator being pivotally carried on said lower tie member at a point intermediate said tubular wheel support and said steering handle support;

e3) a second lever having one end pivotally mounted to said lower tie member, an other end of said second lever having a pivotal attachment pivotally attached to a shaft of said linear actuator, e4) a link member adapted for connecting said second lever with said lower extending portion of said first lever;

e5) a pair of wheel ramps, each wheel ramp being adjustably fixed on a plurality of arms transversely extending from said lower extending portion of said first lever, each of said wheel ramps adapted for guiding and locating wheelchair wheels moved thereon;

e6) a third lever member pivotally mounted at one end to said lower tie member intermediate said steering handle support and said pivotal mounting for said first lever, a second end of said third lever being adapted for grasping a first wheelchair crossbar; and (f) wherein selective activation of said linear actuator rotates said second lever, said rotation of said second lever raising the lower extending portion of said first lever while simultaneously moving said third lever into said grasping arrangement with said first wheelchair crossbar while bringing said upper extending portion of said first lever into engagement with a second wheelchair crossbar to provide lifting of said wheelchair wheels and then a subsequent reverse activation of said linear actuator reverses said grasping and said lifting.

2. An attachment as recited in claim 1 wherein said steering handle includes a detent means adapted for releaseably holding said adjustable positioning of said steering handle.

3. An attachment as recited in claim 1 wherein said steering handle further includes a drive control means adapted for selectively controlling said drive means.

4. An attachment as recited in claim 3 wherein said drive means includes an electric motor.

5. An attachment as recited in claim 1 wherein said drive wheel is configured for moving said attachment on and over soft ground.

6. An attachment as recited in claim 1 wherein each of said tie rods members is selectively adjustable in length for providing a desired alignment of said steering handle with said drive wheel.

7. An attachment as recited in claim 1 wherein said reversing capabilities of said linear actuator are controlled by and with a switch means, said switch means being selectively positioned on said attachment for use by a wheelchair occupant.

8. An attachment as recited in claim 7 wherein said linear actuator is electrically operated.

9. An attachment as recited in claim 8 wherein a shaft of said linear actuator has external threads, said external threads carrying a mating nut thereon, said nut being adapted for providing said pivotal attachment of said second lever with said shaft, said nut being further adapted for linearly moving along said shaft as and when the shaft is rotated.

10. An attachment as recited in claim 1 wherein each of said wheel ramps includes an least one edge guide for providing said guiding of said wheelchair wheels.

11. An attachment as recited in claim 10 wherein each of said wheel ramps includes stops for locating said wheelchair wheels.

12. An attachment as recited in claim 1 wherein said third lever member includes a hook member arrayed for said grasping said first crossbar.

13. An attachment as recited in claim 12 wherein said hook member is adjustably carried on said third lever member for proper selective grasping alignment with said first crossbar.

14. An attachment as recited in claim 1 wherein said coupling means includes a tension means selectively positioned between said third lever member and said first lever, said tension means being adapted for said simulultaneously moving of said third lever member.

15. An attachment as recited in claim 14 wherein said tension means includes an extension spring, said extension spring having a sufficient free length for disengaging said third lever from said first crossbar upon reaching a selected point near the end of said reverse actuation of said linear actuator.

16. An attachment as recited in claim 14 wherein said tension means includes an extension spring carried in a sleeve member, said sleeve member being of a sufficient length for disengaging said third lever from said first crossbar upon reaching a selected point near the end of said reverse actuation of said linear actuator.

17. An attachment as recited in claim 1 wherein said second steering arm includes an adjustable stop means for maintaining a selected drive position of said steering handle.

18. An attachment as recited in claim 10 wherein each of said wheel ramps is adapted for providing a cradling of each of said wheelchair wheels between said transverse arms, and each of said wheel ramps having a hinged approach plate adapted for providing a smooth approach of each of said wheelchair wheels into said cradling.

19. An attachment as recited in claim 1 wherein said upper extending portion of said first lever is pivotally attached to a tie bar member, an included angle between said upper extending portion and said tie bar being controlled by an adjustable reinforcement means for providing a selected entering clearance between said upper extending portion and said second wheelchair crossbar.

* * * * *